March 25, 1952     A. DUWOS     2,590,520
OIL-BATH INTAKE-AIR FILTER
Filed March 3, 1950
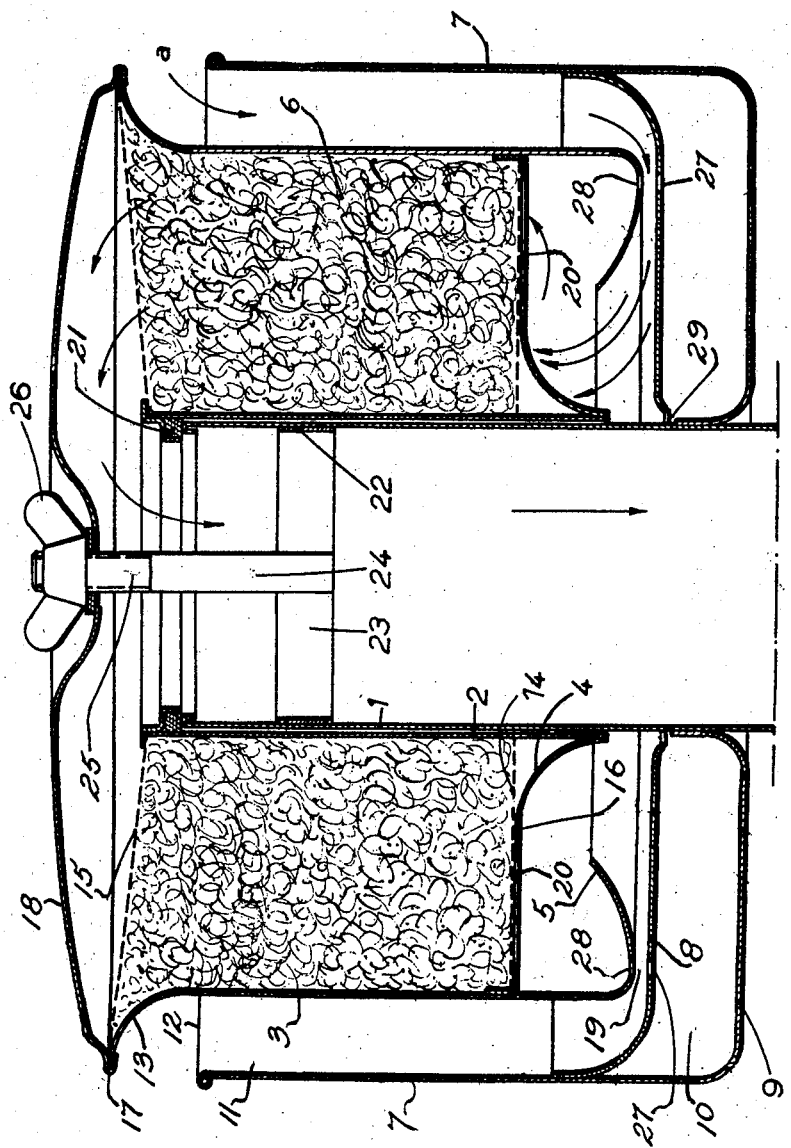
Inventor
Andre Duwos
By Robert E. Burns
Attorney Patented Mar. 25, 1952

2,590,520

UNITED STATES PATENT OFFICE 2,590,520

OIL-BATH INTAKE-AIR FILTER

André Duwos, Saint Cloud, France, assignor to Tecalemit, Societe Anonyme, Paris, France Application March 3, 1950, Serial No. 147,384
In France March 15, 1949

2 Claims. (Cl. 183—15)

Apparatus are already known which are adapted to remove impurities from a stream of air sucked in by compelling the same to follow a winding path from the inlet to the outlet of the apparatus.

In a known type means are provided to accelerate the flow of the fluid to be purified, which fluid sucks oil from a reservoir for the purpose of wetting an air-purifying surface which is swept by the air stream and on which most of the foreign substances are retained; the said airswept surface is formed with a drip from which the impurities are washed down into a sump provided in the oil reservoir.

The stream from which the coarser foreign bodies are thus removed follows its winding path and is finally led through a removable filtering element designed to retain the finer dust particles still present in the air stream. However, the latter also contains a certain amount of oil droplets which accumulate in the said filtering element. This makes it necessary to frequently clean the latter, for want of which in the long run the oil retained therein is carried away by the outflowing air.

The intake-air filter according to the invention is designed to do away with this inconvenience; a particularly remarkable feature of said filter resides in the fact that the very means, for instance a Venturi passageway, that serve to accelerate the flow of sucked-in-air are also availed of to bring such oil as may still be present in the air stream after the latter has swept the purifying surface back into the wetting circuit of the latter, and this, owing to the fact that the filtering element is located at a higher level than the oil reservoir and that it is so designed that the oil intercepted in the said element falls back into said reservoir contrawise to the direction of the air flow.

A number of features of the filter according to the invention are still worth to be mentioned, amongst which the following ones:

From that point where the air flow is accelerated and oil is sucked the flow is decelerated progressively and uniformly in order to lessen the head losses.

Below the point of maximum rate of flow the changes in the direction of the stream occur at places where the rate of flow is so low that the head losses involved by said changes are small and that the larger oil droplets have an opportunity of settling on the walls.

As to the finer droplets, they are carried along by the flow of sucked air into the filling of the filtering element for the purpose of wetting said filling in such a manner that it can retain the finer impurities.

The rate of flow at the inlet of the filtering element is higher than at its outlet, it being sufficient here and insufficient there to cause oil to be carried along, whereby the oil that entered said element can drip contrawise to the direction of the air flow.

Further advantages and features of the invention will be pointed out in the following specification in which reference is had to the drawing appended hereto by way of example and the single figure of which is an axial sectional view of the apparatus.

In the drawing,

The filter is generally round in shape and comprises an axial tube 1 surrounded by a concentric annular element between the inner side wall 2 and the outer side wall 3 of which there are arranged: at its lower end a pair of cooperating deflectors 4, 5; in its top portion a filtering element 6 of comparatively considerable thickness.

The whole composed of the deflectors and the filtering element is arranged within a casing 7 which is larger in diameter and which is formed with a horizontal partition 8 located at some distance above its bottom 9; the space between the partition 8 and the bottom 9 provides an oil reservoir 10.

The annular space 11 between the side wall 7 of the casing and the outer wall 3 of the annular element provides the intake for the air sucked by the internal combustion engine (not shown) equipped with the air filter.

The outer wall 3 of the annular element extends a certain distance above the open top 12 of the casing 7 and is flared out to a toric shape at 13 in order to make it easier to the air to enter the annular space 11.

The filling of the filtering element 6 is enclosed between a pair of cloth walls 14, 15.

The bottom cloth wall 14 is located immediately above the horizontal partition 16 connected with the inner deflector 4 while the top cloth wall 15 is set at 17 at the top of the apparatus between the top edge of the annular element and the cover 18.

The casing 7 is secured in its portion providing the reservoir 10 to the axial tube 1 and the whole composed of the filtering element 6, the deflectors 4, 5 and the cover 18 is mounted removably on the tube 1.

The outer deflector 5 is an extension of the outer wall 3 directed towards the axis of the apparatus; its outline is such that the section available for the flow of air is restricted considerably at 19 and that the rate of flow of the air stream is likewise increased considerably, below which point 19 the rate of flow is decreased progressively and the air stream is thenceforth directed by the convex surface of the outer deflector 3 onto the companion inner deflector 4 which is likewise designed to secure a uniform decrease in the rate of the air flow.

The horizontal partition 16 is formed with apertures 20 which are as large as possible provided their total section is less than the section at the outlet of the filtering element 15; owing to this arrangement a further uniform decrease in the rate of flow is obtained.

The shape of the cover 18 is chosen with a view as much as possible to lessen the loss of head as the air stream is abruptly deflected towards the central tube 1 which is designed in any suitable manner for connection with the air intake pipe of a carburettor (not shown).

The removable unit composed as stated of the filtering element 6, the deflectors 4, 5 and the cover 18 is mounted on the central tube 1 with the interposition of a packing ring 21 and secured to said tube through the medium of a ring 22 to which are secured the outer ends of radial arms 23 the inner ends of which are rigid with a stem 24 the upper end 25 is threaded to receive a butterfly clamping nut 26.

Circular rows 27, 28 of perforations are provided respectively in the partition 8 and the deflector 5 at the throat of the Venturi passageway.

A space 29 is left free between the central tube 1 and the partition 8.

The operation of the filter is as follows:

The air sucked in by the internal combustion engine enters the device through the annular aperture $a$, the access being facilitated by the torical shape of the wall 13; the air then flows through the annular space 11 down to the throat 19 of the Venturi pasageway where is is accelerated.

Below the said throat the walls are so shaped that the rate of the air flow is decreased progressively and uniformly with a view to avoid head losses, and this result is secured by expediently shaping and arranging the deflectors 5 and 4 and dimensioning the sectional areas of the passageways at the inlet and the outlet of the filtering element 6.

As a result of the suction effect created by the Venturi pasageway, oil is sucked from the reservoir 10 through the perforations 27 that will wet the top face of partition 8 as well as the respectively convex and concave faces of deflectors 5 and 4 which are swept by the stream of sucked-in air.

Below the Venturi pasageway the changes in the direction of flow occur at places at which the rate of flow is so low that the resulting losses of head are unimportant and that the larger droplets have an opportunity of settling on the surface of partition 8 and deflectors 5 and 4 which are swept by the air stream.

The finer droplets are carried along into the filling of the filtering element 6 for the purpose of wetting the same so that the finer impurities can be retained in the said element 6.

As already stated, the rate of flow is higher at the inlet than at the outlet of the filtering element 6.

The rate of flow at the inlet is sufficient to cause oil to be carried along whereas at the outlet it is insufficient to do so, with the result that the oil can drip against the flow of sucked-in air.

An important feature of the device according to this invention resides in the fact that owing to the provision of the holes 28 in the throat of the Venturi passageway most of the oil that did not settle on the surfaces swept and of the surplus oil deposited in the filling of the element 6 is returned to the wetting circuit; the larger oil droplets whirled onto the surfaces swept by the air stream can likewise flow back into the reservoir 8 through the annular passageway 29 provided between the central tube 1 and the aperture in partition 8, which is larger in diameter.

What I claim is:

1. An air filter comprising a vertical tube for the delivery of the purified air connected at its lower end with air-sucking means, an annular receptacle delimited by an inner tubular wall fitted on said tube, an outer cylindrical wall coaxial with said tubular wall, a cover resting with its rim on the upper edge of said cylindrical wall and extending clear of the upper ends of said tubular wall and tube and a perforate annular bottom rigid at its inner edge with said inner tubular wall and at its outer edge with the said cylindrical wall, the latter being formed beyond said perforate bottom with a downwardly-projecting extension bent inwards to an annular gutter below part of said perforate annular bottom, said gutter being perforated in its lowermost portion with a circular row of drip holes, a cloth ring laid on said perforate annular bottom, filtering material rested on said cloth ring and filling said annular receptacle, a cloth ring covering said filling, a double-bottomed casing surrounding said receptacle, rigid with said vertical tube and delimiting together with the outside of said annular receptacle an annular air-intake passageway, the perforate false-bottom of said double-bottomed casing delimiting a choked air-intake passageway together with the outside of said annular gutter and an oil sump together with the imperforate bottom of said casing.

2. In an air filter according to claim 1, a casing false bottom formed at its rim portion with an imperforate bend adapted to deflect the inflowing air towards said choked air-intake passageway and a perforate receptacle bottom formed at its hub portion with an imperforate bend adapted to deflect the inflowing air towards the perforate portion of said receptacle bottom.

ANDRÉ DUWOS.

REFERENCES CITED

The following references are of record in the file of this patent:

UNITED STATES PATENTS

| Number | Name | Date |
|---|---|---|
| 2,168,670 | Evans | Aug. 8, 1939 |
| 2,171,752 | Kamrath | Sept. 5, 1939 |
| 2,214,731 | Kamrath | Sept. 17, 1940 |
| 2,287,629 | Mieras | June 23, 1942 |
| 2,509,802 | Blair et al. | May 30, 1950 |

FOREIGN PATENTS

| Number | Country | Date |
|---|---|---|
| 563,688 | Great Britain | Aug. 22, 1944 |